United States Patent [19]

Danco

[11] 4,099,252

[45] Jul. 4, 1978

[54] METHOD AND MEANS FOR ALTERING THE STATES OF CONTROL SIGNALS IN AN ON-LINE CONTROL SYSTEM

[75] Inventor: William J. Danco, Roanoke, Va.

[73] Assignee: General Electric Company, Salem, Va.

[21] Appl. No.: 485,573

[22] Filed: Jul. 3, 1974

[51] Int. Cl.$^2$ .............................................. G06F 9/06
[52] U.S. Cl. .................................... 364/900; 364/300
[58] Field of Search ........................ 340/172.5; 444/1; 235/152

[56] References Cited

U.S. PATENT DOCUMENTS

| 3,668,653 | 10/1968 | Fair et al. ........................ 340/172.5 |
| 3,686,639 | 12/1969 | Fletcher et al. ................. 340/172.5 |
| 3,806,714 | 4/1974 | Otsuka et al. ..................... 235/152 |

Primary Examiner—Raulfe B. Zache
Attorney, Agent, or Firm—Arnold E. Renner

[57] ABSTRACT

A programmable data processor or controller serving as the main control in a control system contains an executive program for controlling the transfer of information between the processor and system equipment, updating that information during on-line control of the equipment and modifying the executive program to change operating parameters of the system while the data processor is controlling the system equipment. Modification of the executive program and displaying of system parameters related to the executive program and the system equipment is accomplished through the use of an operator's console which communicates with the data processor and system equipment as a result of operator intervention.

17 Claims, 1 Drawing Figure

METHOD AND MEANS FOR ALTERING THE STATES OF CONTROL SIGNALS IN AN ON-LINE CONTROL SYSTEM

BACKGROUND OF THE INVENTION

1. Field of the Invention

This invention relates generally to on-line computer control systems and more particularly to such systems including a programing console for selectively altering input and output data in a computer or controller for controlling process equipment while the system is on-line.

2. Description of the Prior Art

Process control computers for on-line control of process equipment have been in use for a number of years. Most recently, programmable controllers have come into use for controlling various process equipments of the type heretofore controlled by conventional relay logic controllers. The programmable controller replaces those conventional controllers by the use of a program in its memory which simulates the relay logic inherent in relay type controllers. The program performs its control function by directing the reading of input conditions in the form of signals from the process equipment into the controller memory, performing logical operations on those conditions in accordance with the simulated relay logic, and sending output conditions in the form of control signals to the equipment.

Occasions arrive in process control systems when it is desirable to override or force those input and output conditions to an opposite state. One occasion is when trouble-shooting a malfunctioning system to isolate the location of some inoperable or abnormally operating device. Other occasions arise when the forcing or overriding of signals is desirable, such as during the start-up of a new system when debugging software and hardware is normally required.

To the best of this inventor's knowledge this forcing and overriding of signals has always been done in prior systems by the physical placement of a jumper wire directly on a terminal connector or the like and connecting the jumper to a suitable potential. This connection of jumpers is a timed consuming task. Further, it is frequently difficult to connect a jumper because of the inaccessibility to the equipment. Additionally, the placement of jumpers on equipment can create systems problems, particularly if they are inadvertently left in the equipment. This can be troublesome if a new maintenance man is assigned to the system with no knowledge of the existence of the jumpers.

It is therefore desirable to provide a programmable controller system or the like for on-line control of process equipment which provides an instant and easy means and method of forcing or overriding input and output conditions of the system whereby a maintenance operator of the system need make no physical jumper wire connections to effect the forcing and whereby indication is always given of the presence of a forced or overriding condition.

SUMMARY OF THE INVENTION

The foregoing disadvantages are overcome by the present invention by providing a control system including an operator or programming console for communicating with a programmable controller or computer to effect the forcing of input and output conditions in the controller memory, whereby the input and output conditions serve to effect the generation of signals for controlling the equipment.

An executive program is stored in the memory of the controller. This program directs all communications between the controller and the controlled equipment and between the controller and the console. It also contains instructions of suitable type which are formatted to simulate a control circuit for controlling the system. In the preferred embodiment, this control circuit has the format of a plurality of logic strings. Each logic string is comprised of a plurality of logic elements interconnected to perform logical operations to collectively perform a control function. At least one logic element in each string is a switch element of identifiable type and has a logical state or condition controlled by the instantaneous state of an input or output condition stored in the controller memory. Input conditions are those stored in the computer from the controlled equipment as directed by the program. Further, at least one other of the logic elements in such logic string is a continuity status element having a state controlled by the states of the switch elements in its associated string. Each continuity status element serves to effect an output status condition in memory, the state of which is utilized to provide a control signal to the controlled equipment as directed by the program.

The operator console of the present invention provides a means and method of selectively forcing the states of the input and output conditions in the controller memory. This has the distinct advantage of being able to effectively force or override any input or output signal communicated between the controller and the equipment without making physical jumper wire connections in the system.

A selector or manually operable means on the console allows the specifying and displaying of any identifiable input or output condition in the memory and the state to which the specified condition is to be forced. Additionally, another manually operable means is provided for transmitting a forcing signal representative of the condition to which the specified condition is to be forced to the controller and indicating that a forced condition resides in the memory. Because of this latter indicating feature, an operator of the console is always aware that one or more signals or conditions are in a forced state.

When a signal or condition is forced by the console operator, that forced condition will affect the logical operation of the logic string to which it is related whereby the output status condition of that logic string will result in the generation of an output control signal from the controller to the equipment as either a forced signal, override signal or a signal representative of the altered operation of the logic in the string associated with that output control signal.

Utilizing the console, the operator can force as many input and output conditions as desired. The number of forced conditions is limited only by the amount of memory space allocated for this purpose.

In the basic operation of the invention all representations of input signals from the equipment are first stored in corresponding input condition locations in memory. Next, utilizing the console, a selected input or output condition is forced to its desired state. The program then sends all output conditions to the equipment for the control thereof. Utilizing the stored representations of the input and output conditions related to the logic elements in each string, the program next updates the state of each continuity status element in each logic string in accordance with logical operations performed on those input and output conditions as defined by the simulated control circuit. After all output conditions have been updated or generated the above described basic operations are repeated.

It is therefore an object of the present invention to provide a control system having enhanced operating capabilities.

It is another object to provide an on-line computer control system capable of forcing the states of control signals transferred between the computer and equipment external thereto.

A still further object is to provide a system including an operator console in communication with a programmable controller for forcing and overriding control signals transferred between the controller and equipment being controlled while the system is in operation.

Yet another object is to provide an operator console for effecting changes in the operating characteristics of a program simulating a control circuit in a computer while the computer controls equipment operating in accordance with the characteristics of the circuit.

A further object is to provide an on-line computer control system of the type for controlling equipment and including an operator console capable of communicating forcing and unforcing signals to the computer to alter the states of control signals transferred between the computer and the equipment.

BRIEF DESCRIPTION OF THE DRAWINGS

While the novel features of this invention are set forth with particularity in the appended claims the invention both as to organization and content will be better understood and appreciated along with other objects and features thereof from the following detailed description taken in conjunction with the drawings in which:

Figure 1:
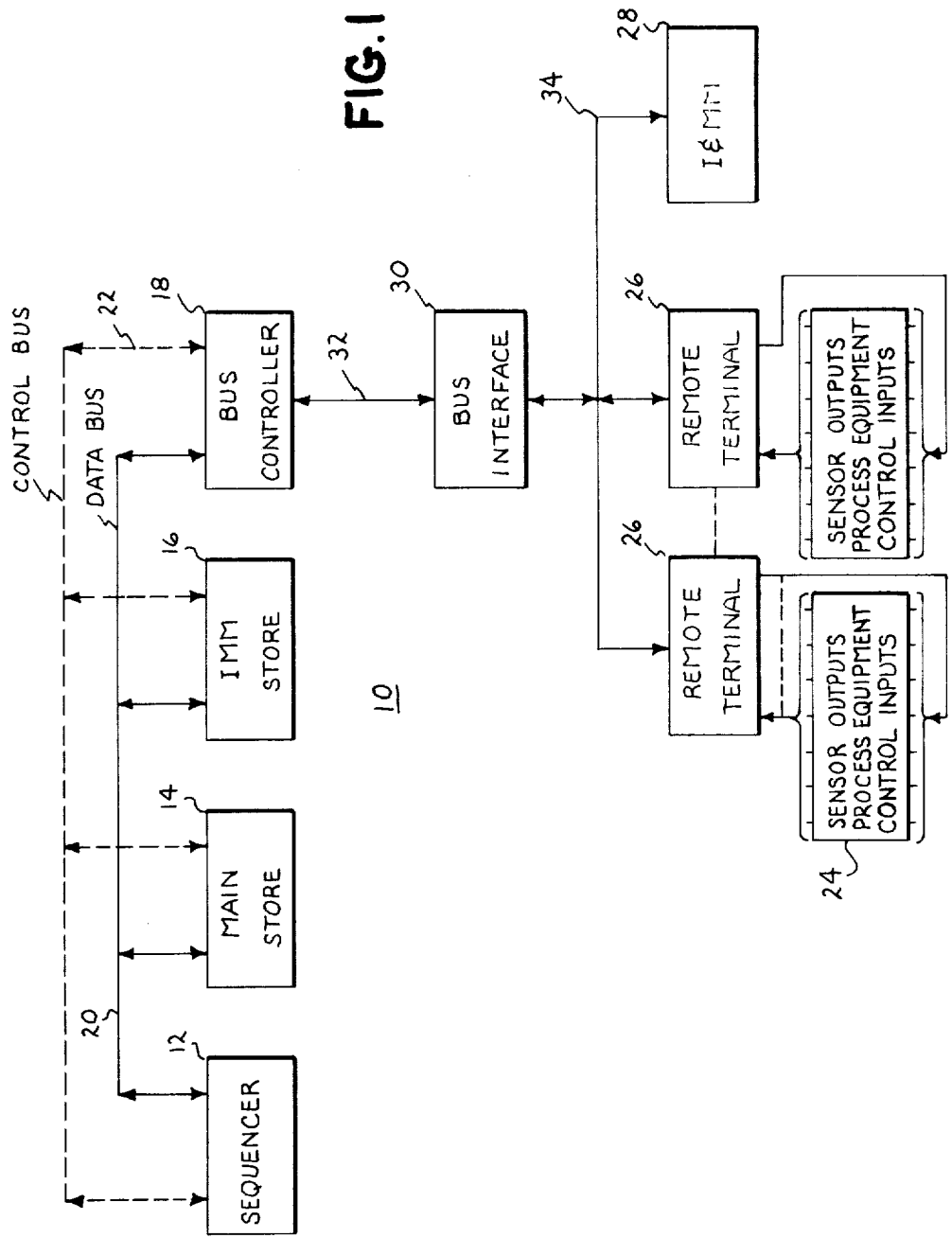
FIG. 1 is a major block diagram of a programmable data processor control system of the type disclosed herein.

For a complete description of the system of FIG. 1 and of my invention, reference is made to U.S. Pat. No. 3,969,722, "Method And Apparatus For Operator Interrogation Of Simulated Control Circuits" by William J. Danco and Arthur P. Given, issued July 13, 1976 and assigned to the assignee of the present invention. More particularly, attention is directed to FIGS. 2 through 29 and 31 through 67 of the drawing and to that part of the descriptive portion of the specification starting at Column 2, line 58 and continuing through the end of Column 150 (including the incorporated U.S. Pat. Nos. 3,921,146 and 3,924,240) and further including Appendix A (beginning at the bottom of Column 150 and continuing into Column 170 and Appendix B (beginning in Column 170 and continuing to the claims in Columns 223 and 224) all of which are incorporated hereinto by reference and made a part hereof as if fully set forth herein.

We claim:

1. A method of altering the operation of a computer controlling equipment in a system of the type operable in response to signals representative of input and output conditions resulting from logical operations based upon operating parameters of the equipment in response to forcing signals provided to the computer from an operator console in communication therewith, comprising the steps:

(a) storing in a memory of said computer an executive program serving to,
  (1) direct on-line communications between the computer and said equipment and between the computer and said console, and
  (2) simulate an equipment control circuit having a format comprised of a plurality of logic strings, each logic string including at least one switch element of an identifiable type and logical condition controlled by the state of a related condition and a continuity status means having a conducting condition controlled by the logical condition of the switch elements of its associated logic string, said continuity status means generating output conditions for storage in said memory and serving to effect the generation of output control signals for said equipment;
(b) repetitively storing in said memory, input conditions representative of the states of signals provided to said computer from said equipment;
(c) utilizing said console to selectively force the state of a one of plurality of input or output conditions in said memory in accordance with the forcing signals provided to said computer from said console subsequent to each repetitive storing of the input conditions whereby a plurality of input and output conditions may be selectively forced and stored in said memory;
(d) repetitively sending output control signals representative of the states of previously generated and forced output conditions from said computer to said equipment; and
(e) repetitively generating the states of output conditions in accordance with logical operations, performed on input and output conditions, as specified by the executive program simulating the equipment control circuit.

2. In a system of the type including a computer for controlling equipment and communicating with an operator console, a method of forcibly changing the states of input and output status conditions stored in the computer, which stored conditions act to control the equipment while the system is operating on-line comprising the steps:

(a) storing in a memory of said computer a program serving to,
  (1) direct on-line communications between the computer and said equipment and between the computer and said console,
  (2) simulate a control circuit having a format comprised of a plurality of logic strings, each defining operable logic and including a plurality of logic elements, at least one of said elements being a variable state switch element of definable type related to a status condition controlling its state and another being a variable state continuity status element controlled by the states of the switch elements of its associated logic string,
  (3) direct the storage of identifiable status conditions representing the instantaneous states of the logic elements of each logic string, and p2 (4) direct the saving and restoration of specified output status conditions;
(b) repetitively running said program to,
  (1) store in said memory input status conditions representative of the states of signals provided thereto from said equipment, (2) save the states of first specified output status conditions in prescribed memory locations and store, for the restoration thereof, the states of previously saved second output status conditions into memory locations corresponding to those previously occupied by the first output status conditions, (3) transfer output signals representative of the states of previously generated and forced output status conditions from said computer to said equipment, (4) save the status of the second output status conditions in prescribed memory locations and store, for the restoration thereof, the states of the first output status conditions into those corresponding memory locations previously occupied by the second output status conditions, and (5) generate the state of the output status condition of each logic string in accordance with logical operations performed on status conditions related to the logic elements in each logic string as specified by the program simulating the equipment control circuit; and (c) while running the program, utilizing said console, following the step to save the first output status conditions and restore the second output conditions, to (1) selectively specify to said computer a one of a plurality of logic strings and the identity of a status condition relative to a one of the logic elements in the specified string, and (2) forcibly change the state of the identified status condition whereby a plurality of status conditions may be selectively forced and stored in said memory by the repetitive running of said program and additionally the state of the continuity status element of the specified logic string is affected to generate an output condition as a function of the state of that forcibly changed identified status condition for transfer to said equipment from said computer.

3. The invention in accordance with claim 2 wherein the step of utilizing said console to forcibly change the state of the identified status condition further includes the step of selectively restoring the identified status condition to its original state whereby the operation of the logic string is no longer affected by that identified status condition as forced.

4. The invention in accordance with claim 2 wherein the step of utilizing said console to forcibly change the state of the identified status condition further includes the step to indicate the state of the identified status condition and the fact that a status condition is in a forced state.

5. In a controlled equipment system of the type operable in response to signals resulting from logical operations based upon operating parameters of the equipment, a control system comprising:

(a) a programmable controller including a store having stored therein an executive program serving to, (1) direct on-line communications between said controller and equipment external thereto, (2) simulate an equipment control circuit having a format comprised of a plurality of logic strings, each logic string comprised of a plurality of logic elements, at least one being a switch element of an identifiable type and condition and another being a continuity status element controlled by the condition of the switch elements of its associated logic string, (3) direct the storage of identifiable input and output status conditions representative of the instantaneous conditions of the logic elements of each logic string; and (b) an operator console in communication with said controller comprising, (1) means for selectively specifying to said controller a logic string and the identity of an input or output condition relative to a one of the logic elements, (2) means for specifying a forcing condition, said forcing condition representing a state to which the selected input or output condition is to be changed, (3) means for communicating to said controller a signal representing the forcing condition to forcibly change the state of the identified input or output condition whereby the state of the continuity status element of the specified logic string is affected to generate an output condition as a function of the state of that forcibly changed identified input or output condition to generate an output control signal from said controller for controlling said equipment.

6. The invention in accordance with claim 5 wherein said console further includes means for displaying the identity of the specified input or output condition.

7. The invention in accordance with claim 5 wherein said means for specifying said forcing condition comprises manually operable means which, when operated, selectively specifies the state to which the specified input or output condition is to be changed.

8. The invention in accordance with claim 7 wherein said manually operable means includes means for indicating the state of the specified condition.

9. The invention in accordance with claim 5 wherein said last means comprises manually operable means, which, when operated, effects transfer of the signal representing said forcing condition to said controller.

10. The invention in accordance with claim 9 wherein said manually operable means includes means for indicating that a forced condition resides in said memory.

11. The invention in accordance with claim 9 wherein said manually operable means, when operated in a first instance, communicates the forcing condition to said controller and, when operated in a second instance, effects removal of the forcing condition from said memory, and restoration of the identified condition to its original condition.

12. The invention in accordance with claim 8 wherein said manually operable means may be repeatedly operated to change the forcing condition between first and second states after said means for communicating the signal representing the forcing condition to said controller has once been operated.

13. The invention in accordance with claim 12 wherein said manually operable means comprises first and second switches for changing the forcing condition between said first and second states respectively.

14. A controlled equipment system of the type employing a programmable data processor for controlling the system equipment comprising:

(a) a first program stored in said data processor defining a logic control circuit for development of output signals utilized in the control of the eqiupment in accordance with representations of input signals provided to said data processor from the equipment;

(b) means in said data processor to store representations of input signals derived from the equipment representative of eqiupment operating conditions and to store representations of input signals defining desired equipment operating conditions;

(c) additional program means stored in said data processor for controlling the execution of the first stored program utilizing the stored representations of input signals to develop said output signals; and, (d) means in communication with said data processor operable to selectively effect the generation of desired output signals irresepective of those produced through the use of said additional program means and to selectively provide said representations of input signals defining desired equipment operating conditions irrespective of those derived from the equipment, which desired representations are utilized in the development of output signals through the use of said additional program means.

15. The invention in accordance with claim 14 wherein the last specified means includes an operator console including manually operable elements for effecting the generation of the desired output signals and providing the desired representations of input signals.

16. The invention in accordance with claim 15 wherein all input and output signals are represented by the contents of an identifiable location in an addressable store and in which the manually operable elements of the operator console includes means for prescribing a store address and a means for designating the desired representation and signal.

17. The invention in accordance with claim 16 further including means associated with said console for indicating that a represented input or output signal is selectively defined.

* * * * *